United States Patent
Bunch

(10) Patent No.: US 10,739,105 B2
(45) Date of Patent: Aug. 11, 2020

(54) ACCESSORIES, DEVICES SYSTEMS, AND METHODS FOR RETAINING AND STABILIZING ARCHERY AND OTHER EQUIPMENT

(71) Applicant: BUNCH INNOVATIONS AND SALES, LLC, Cloverdale, IN (US)

(72) Inventor: Dax Bunch, Cloverdale, IN (US)

(73) Assignee: Bunch Innovations and Sales, LLC, Cloverdale, IN (US)

( * ) Notice: Subject to any disclaimer, the term of this patent is extended or adjusted under 35 U.S.C. 154(b) by 0 days.

(21) Appl. No.: 15/545,768

(22) PCT Filed: Jan. 22, 2016

(86) PCT No.: PCT/US2016/014491
§ 371 (c)(1),
(2) Date: Jul. 24, 2017

(87) PCT Pub. No.: WO2016/118839
PCT Pub. Date: Jul. 28, 2016

(65) Prior Publication Data
US 2018/0023916 A1    Jan. 25, 2018

Related U.S. Application Data

(60) Provisional application No. 62/106,504, filed on Jan. 22, 2015.

(51) Int. Cl.
*F41B 5/14*        (2006.01)
*F41A 23/06*    (2006.01)
(Continued)

(52) U.S. Cl.
CPC ........... *F41B 5/1453* (2013.01); *F16M 11/24* (2013.01); *F16M 13/02* (2013.01); *F41A 23/06* (2013.01); *F16F 1/373* (2013.01)

(58) Field of Classification Search
USPC .......... 248/530, 532, 156; 52/102, 103, 155, 52/165, 159; 124/86, 88, 89, 23.1
See application file for complete search history.

(56) References Cited

U.S. PATENT DOCUMENTS 2,552,745 A * 5/1951 Stanley, Sr. ............... G09F 7/20
116/173
3,391,780 A 7/1968 Pasquine et al.
(Continued)

OTHER PUBLICATIONS

International Searching Authority, PCT International Search Report, PCT/US2016/014491, dated Mar. 29, 2016.
(Continued)

*Primary Examiner* — Alfred J Wujciak
(74) *Attorney, Agent, or Firm* — Reichel Stohry Dean LLP; Mark C. Reichel; Natalie J. Dean

(57) ABSTRACT

According to at least one aspect of the present disclosure, a device for retaining and stabilizing archery equipment, such as a bow, includes a first portion configured for attachment to a bow and a second portion configured for attachment to the first portion, the second portion having a distal tip opposite the first portion and configured for insertion into the ground or a stand wherein the device is structured to retain the bow above the ground without the bow touching the ground. In certain embodiments, the device further includes an adjustment element, the adjustment element structured to reversibly and adjustably connect the first portion to the second portion and an attachment mechanism structured to reversibly and adjustably attach the device to the bow, where the adjustment mechanism and the adjustment element are disposed in a first slot and a second slot of the first portion and the second portion, respectively.

20 Claims, 16 Drawing Sheets

(51) Int. Cl.
*F16M 11/24* (2006.01)
*F16M 13/02* (2006.01)
*F16F 1/373* (2006.01)

(56) References Cited

U.S. PATENT DOCUMENTS

| | | | | |
|---|---|---|---|---|
| 5,020,605 | A | * | 6/1991 | Leishman ............. E04H 17/263 173/1 |
| 5,028,166 | A | * | 7/1991 | Leishman ............. E04H 17/263 404/10 |
| 5,104,265 | A | * | 4/1992 | Halloran, Jr. ....... E04H 12/2215 405/244 |
| 5,394,858 | A | | 3/1995 | Karolian |
| 5,619,981 | A | | 4/1997 | Breedlove |
| 5,630,568 | A | * | 5/1997 | Lubrecht .................. F41B 5/14 124/1 |
| 7,090,429 | B1 | * | 8/2006 | Humphrey .......... E04H 12/2215 116/63 R |
| 7,311,097 | B1 | | 12/2007 | Callis |
| 7,314,199 | B1 | | 1/2008 | Ward |
| 9,153,149 | B1 | * | 10/2015 | Curtiss .................. G09F 13/005 |
| 9,394,717 | B2 | * | 7/2016 | Paananen ................ E04H 17/22 |
| 10,119,293 | B1 | * | 11/2018 | McCugh ............. E04H 12/2215 |
| 2005/0067609 | A1 | * | 3/2005 | Walmsley ........... E04H 17/1439 256/65.01 |
| 2006/0220318 | A1 | * | 10/2006 | Law .......................... F41J 1/10 273/407 |
| 2007/0221588 | A1 | | 9/2007 | Notestine |
| 2010/0101484 | A1 | * | 4/2010 | Norton ................ E04H 12/2215 116/63 R |
| 2010/0313864 | A1 | | 12/2010 | Gardner |
| 2014/0361143 | A1 | | 12/2014 | May |

OTHER PUBLICATIONS

International Searching Authority, Written Opinion of the International Searching Authority, PCT/US2016/014491, dated Mar. 29, 2016.

* cited by examiner

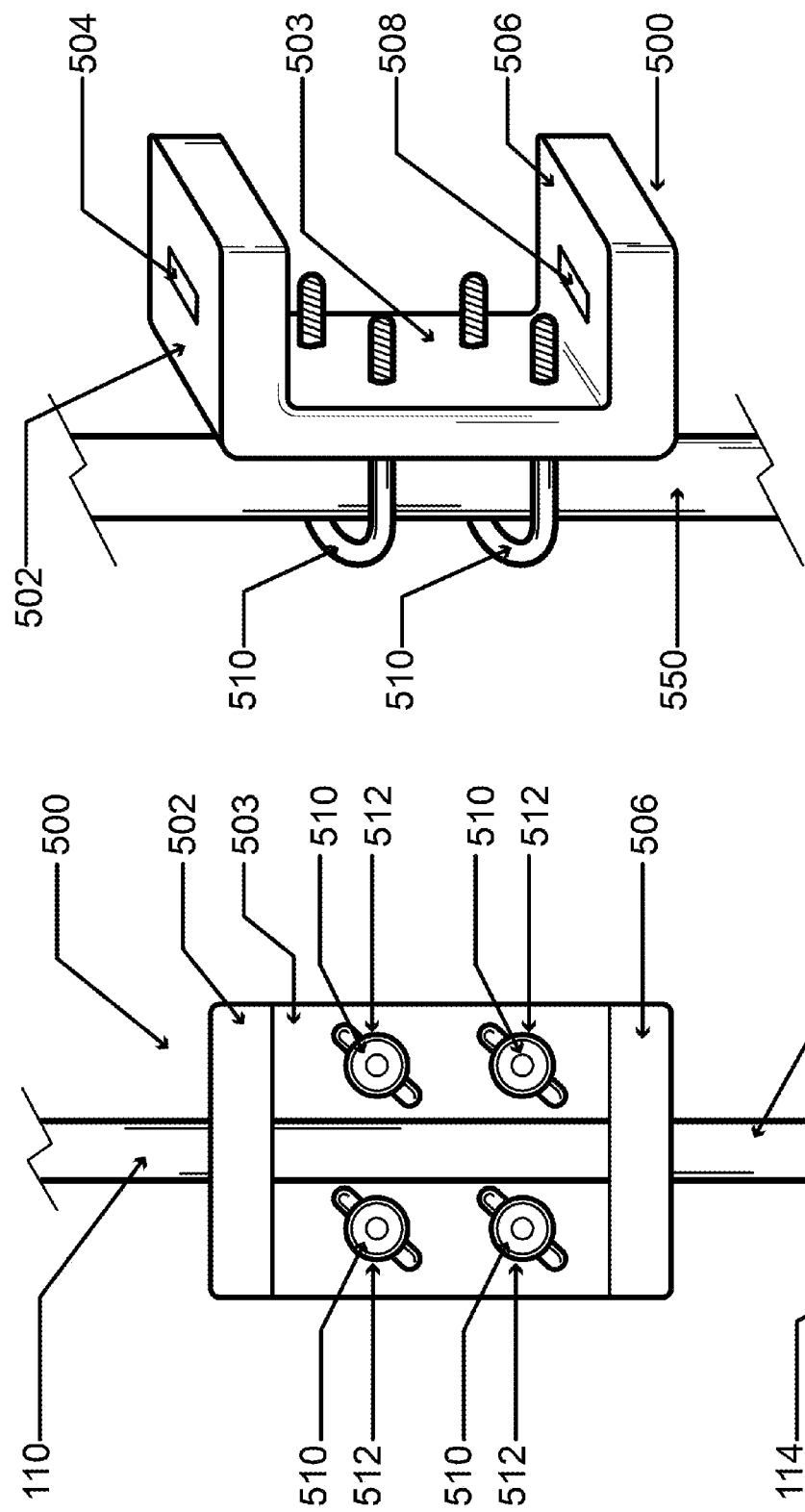

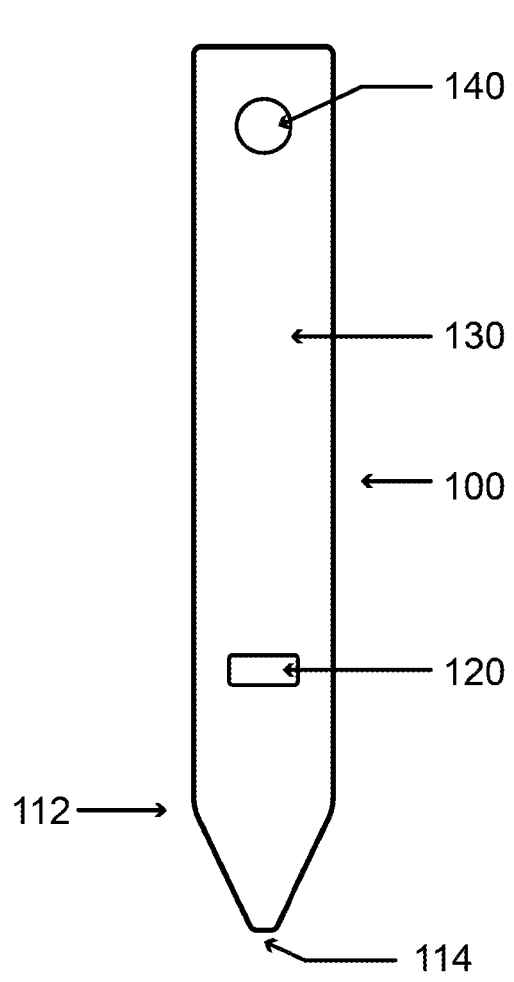
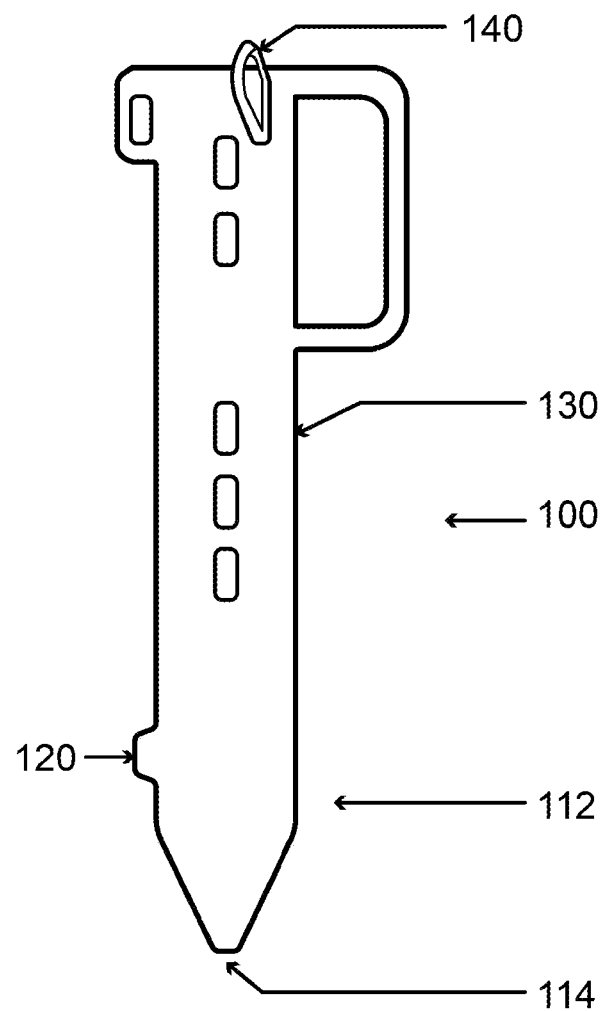
FIG. 13A  FIG. 13B

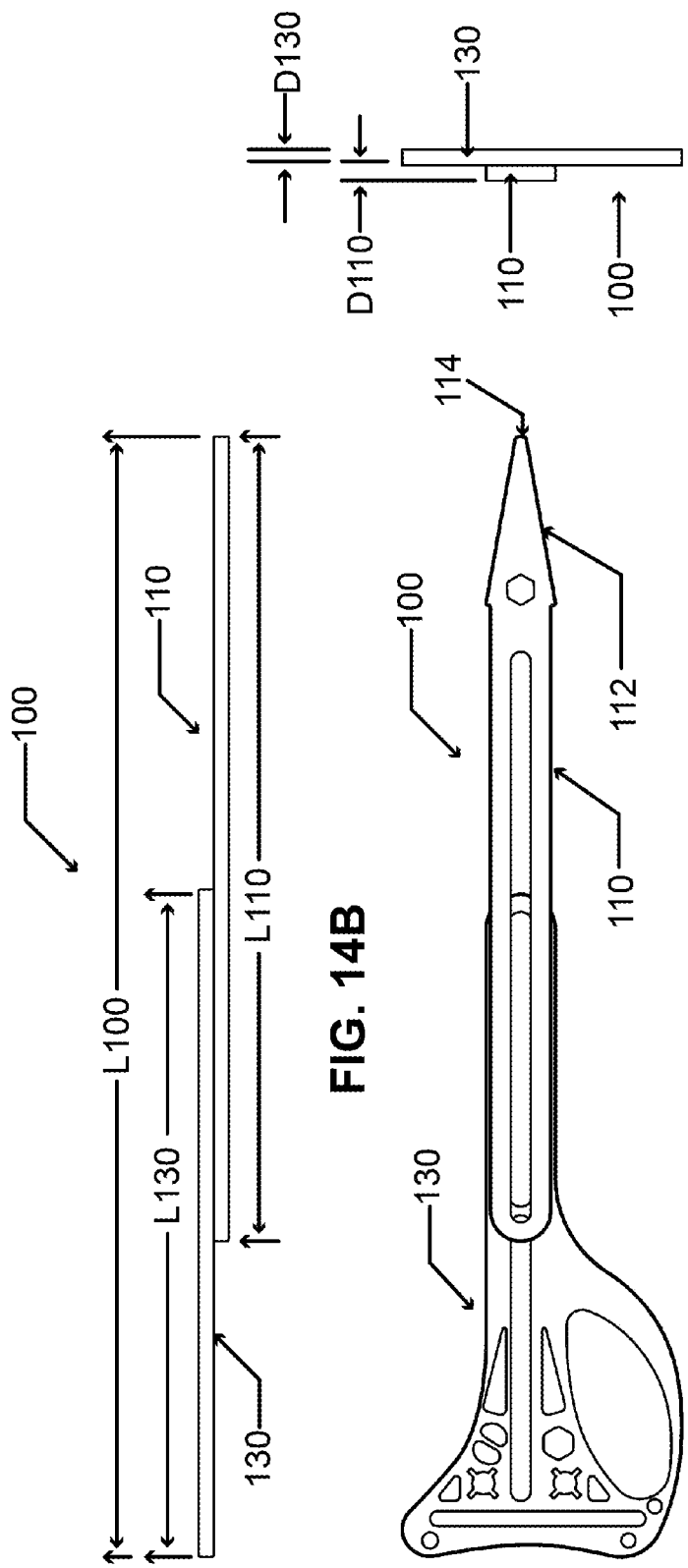

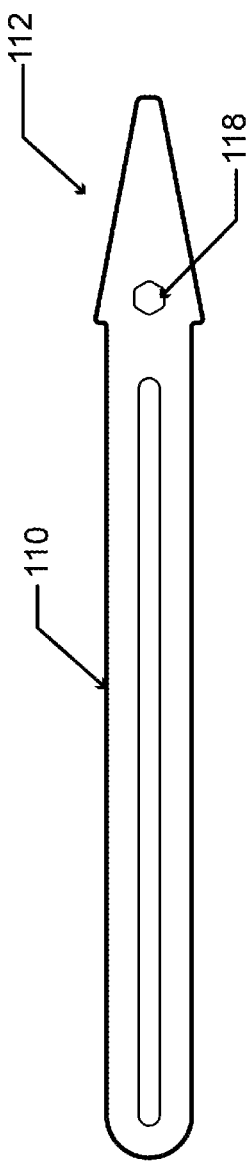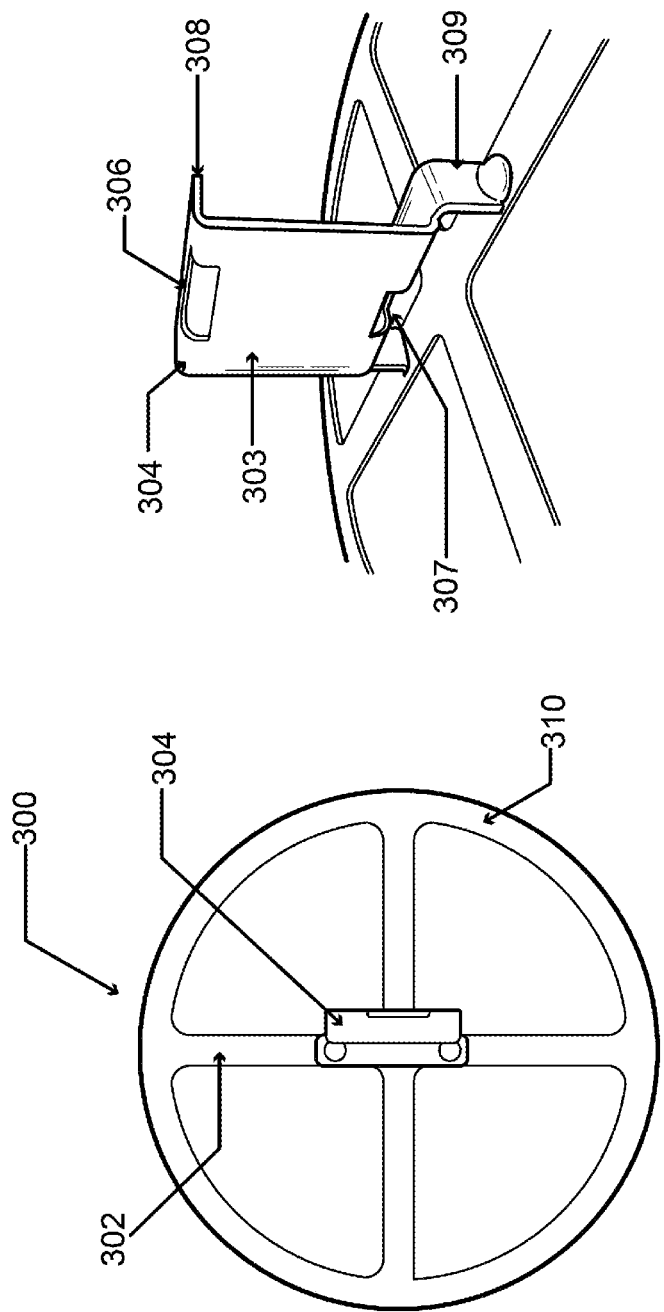

ACCESSORIES, DEVICES SYSTEMS, AND METHODS FOR RETAINING AND STABILIZING ARCHERY AND OTHER EQUIPMENT

PRIORITY

The present application is related to, claims the priority benefit of, and is U.S. 35 U.S.C. 371 national stage patent application of, International Patent Application Ser. No. PCT/US2016/014491, filed Jan. 22, 2016, which is related to, and claims the priority benefit of, U.S. Provisional Patent Application Ser. No. 62/106,504, filed Jan. 22, 2015, the contents of which are hereby incorporated by reference in their entirety into the present disclosure.

BACKGROUND

Users of archery equipment, such as hunters and target shooters, commonly place their bows on the ground, against a tree, and the like, causing unnecessary damage and general wear and tear to portions of said bows. Such wear and tear can not only generally cause portions of the bows to need to be replaced, but can also result in a safety hazard, such as if a cam/wheel or string were to break due to said wear and tear.

In view of the same, novel devices and systems useful to retain bows and other equipment to minimize and/or eliminate wear and tear would be commercially appreciated and desired in the marketplace.

BRIEF SUMMARY

In at least one exemplary device embodiment of the present disclosure, the device comprises a first portion configured for attachment to the first portion, the second portion having a distal tip opposite the first portion and configured for insertion into the ground or a stand, wherein the device is structured to retain the bow above the ground without the bow touching the ground. The device further includes an adjustment element, the adjustment element structured to reversibly and adjustably connect the first portion to the second portion, and an attachment mechanism structured to reversibly and adjustably attach the device to the bow, wherein the adjustment mechanism is disposed in a first slot and a second slot, the first slot defined through and extending axially along the first portion, and the second slot defined through and extending axially along the second portion, and wherein the adjustment element is disposed in the first slot and the second slot. In certain embodiments, the adjustment mechanism comprises a block disposed between the first portion and the bow and a head portion configured to engage the bow, wherein the block comprises a compressible, vibration-dampening material. In certain embodiments, the head portion comprises a hook. In certain embodiments, the attachment mechanism comprises a bracket extending generally perpendicular from the first portion, the bracket comprising a bracket slot therethrough configured to accept a riser stabilizer mount.

In at least one exemplary device embodiment of the present disclosure, the first portion of the device has a first axial length of about 12 inches, the second portion has a second axial length of about 15 inches, and the device has an axial device length adjustable through a range of about 15 to 25 inches. In certain embodiments, the first portion has a first width and the second portion has a second width, and wherein the second width is greater than the first width.

In at least one exemplary device embodiment of the present disclosure, the device further includes a peg adjustably connected to and extending from the second portion, the peg structured to accept a generally vertical load, the load being sufficient to drive the device into the ground to a depth sufficient to support the device and bow. In certain embodiments, the peg is an extension nut. In certain embodiments, the peg is disposed in a second slot at a distance of at least 4 inches from the distal tip, the second slot defined through and extending axially along the second portion.

In at least one exemplary device embodiment of the present disclosure, the first portion of the device includes a handle aperture and at least one accessory aperture. In certain embodiments, at least one accessory aperture is structured as a broadhead wrench configured to accept an arrow broadhead. In certain embodiments, the accessory aperture is configured to accept two-, three- or four-blade broadheads. In certain embodiments, two or more accessory apertures are configured to form an accessory rib configured to accept an arrow nock. In certain embodiments, at least one accessory aperture is configured with a hexagonal shape. In certain embodiments, at least one accessory aperture is configured to enable a camera to be mounted to the first portion.

In at least one exemplary device embodiment of the present disclosure, the second portion of the device includes a distal end opposite the first portion and adjacent the distal tip, wherein the distal end is generally tapered from a largest width of the second portion to the distal tip. In certain embodiments, the second portion includes a hanging aperture. In certain embodiments, the hanging aperture is configured with a hexagonal shape.

In at least one exemplary device embodiment of the present disclosure, the device further includes a stand including one or more legs and a riser, the stand structured to rest upon the ground and retain the bow above the ground within the stand without the bow touching the ground, where the riser is connected to the one or more legs and comprises at least one aperture configured to accept and reversibly retain the distal tip of the second portion. The device further includes one or more washers disposed between at least one of the adjustment element and the attachment mechanism, the one or more washers comprising a compressible, vibration-dampening material.

In at least one exemplary device embodiment of the present disclosure, an apparatus includes a first portion having a first slot defined therein, a second portion having a second slot defined therein, the second portion disposed adjacent the first portion such that the first slot and the second slot at least partially align, wherein the second portion includes a proximal end and a distal end, the proximal end disposed adjacent the first portion and the distal end terminating in a tapered distal tip, the distal tip configured to retain the apparatus in the ground or in a stand, an adjustment element disposed in the first slot and the second slot, the adjustment element structured to adjustably secure the first potion to the second portion, an attachment mechanism disposed in the first slot and the second slot, the attachment mechanism structured to adjustably secure the first portion and the second portion to a bow, and a peg attached to the second portion at or near the distal end, where the apparatus is configured to retain bow attached thereto in a substantially vertical position when the distal tip is inserted into the ground or the stand.

In at least one exemplary device embodiment of the present disclosure, a system includes a bow configured to shoot arrows and a device, the device including a first portion including an attachment aperture, a second portion configured for attachment to the first portion, the second portion having a distal tip at or near a distal end of the second portion opposite the first portion, the distal tip configured for insertion into the ground or a stand, an adjustment element disposed in the first slot and the second slot, the adjustment element structured to adjustably secure the first potion to the second portion, an attachment mechanism disposed in the first slot and the second slot, the attachment mechanism structured to adjustably secure the first portion and the second portion to a bow, and a peg attached to the second portion at or near the distal end, wherein the device is structured to retain the bow above the ground without the bow touching the ground.

In certain embodiments, the system further incudes a stand, the stand including a base portion and a riser, the base portion structured to rest upon the ground and the riser connected to the base portion, wherein the riser comprises an upper portion defining an upper riser aperture therethrough and a lower portion defining a lower riser aperture therethrough, the upper portion connected to the lower portion by a back portion extending therebetween, where the upper riser aperture and lower riser aperture are configured to receive the distal tip and at least part of the distal end of the second portion, and where the stand is structured to retain the bow above the ground within the stand without the bow touching the ground, and wherein the base portion includes one or more legs connecting the riser to an outer disk. In certain embodiments, the system further includes a mounting bracket including an upper portion defining an upper aperture therethrough and a lower portion defining a lower aperture therethrough, wherein the upper aperture and lower aperture are configured to receive at least a part of the distal end of the second portion therethrough, where the mounting bracket is configured for mounting to part of an object by fasteners that secure the mounting bracket to the object. In certain embodiments, the system further includes one or more accessories.

BRIEF DESCRIPTION OF THE DRAWINGS

The disclosed embodiments and other features, advantages, and disclosures contained herein, and the matter of attaining them, will become apparent and the present disclosure will be better understood by reference to the following description of various exemplary embodiments of the present disclosure taken in conjunction with the accompanying drawings, wherein:

FIGS. 12A and 12B show views of a universal mounting bracket, according to exemplary embodiments of the present disclosure;

FIG. 13A shows a device not coupled to a bow, according to an exemplary embodiment of the present disclosure;

FIG. 13B shows a device not coupled to a bow, according to an exemplary embodiment of the present disclosure;

FIG. 14A shows a plan view of a first portion and a second portion of a device, according to an exemplary embodiment of the present disclosure;

FIG. 14B shows a side view of a first portion and a second portion of a device, according to an exemplary embodiment of the present disclosure;

FIG. 14C shows an end view of a first portion and a second portion of a device, according to an exemplary embodiment of the present disclosure;

FIG. 16 shows a plan view of a second portion of a device, according to an exemplary embodiment of the present disclosure;

FIG. 17A shows a plan view of a stand for a device, according to an exemplary embodiment of the present disclosure; and FIG. 17B shows a perspective detailed view of a stand for a device, according to an exemplary embodiment of the present disclosure.

Figure 1:
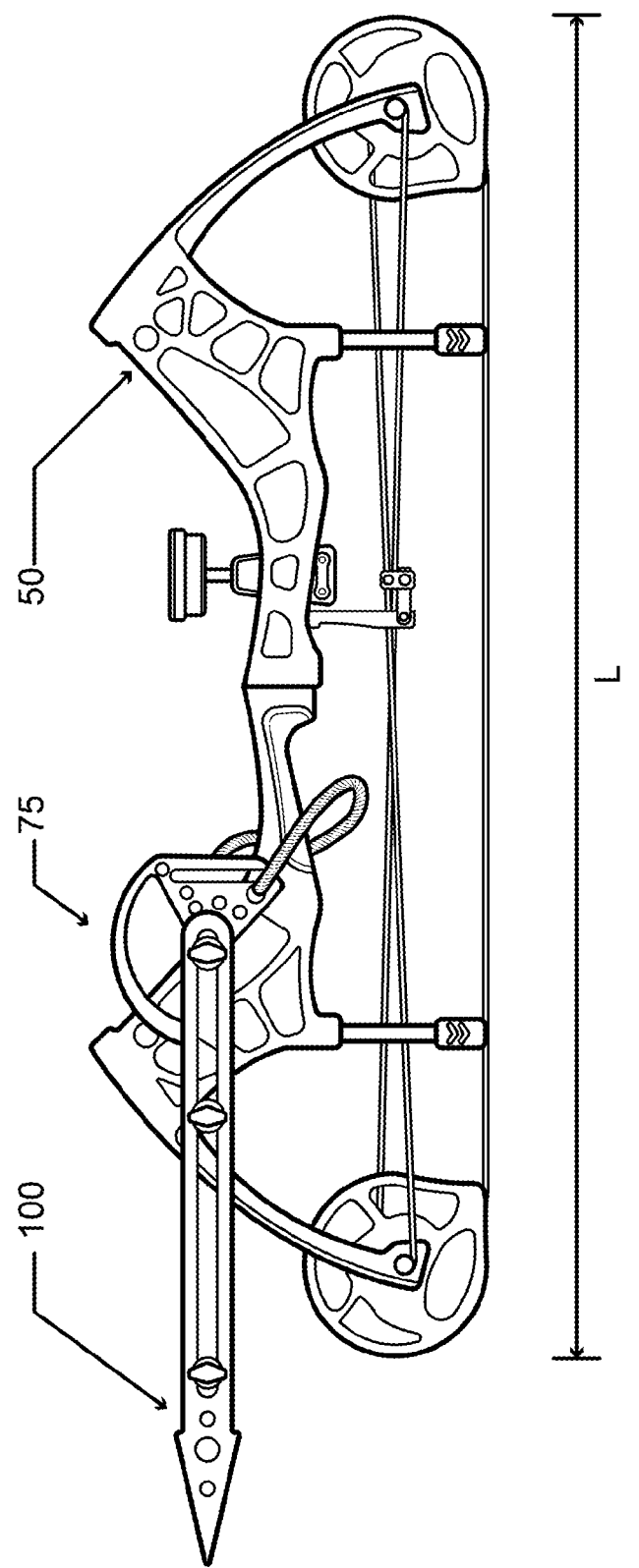
FIGS. 1 and 2 show a device coupled to a bow, according to exemplary embodiments of the present disclosure

An overview of the features, functions and/or configurations of the components depicted in the various figures will now be presented. It should be appreciated that not all of the features of the components of the figures are necessarily described. Some of these non-discussed features, such as various couplers, etc., as well as discussed features, are inherent from the figures themselves. Other non-discussed features may be inherent in component geometry and/or configuration.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

The present disclosure includes disclosure of devices and systems and methods of using and making the same, configured to protect components of bows, such as those used for hunting and/or target shooting purposes.

Figure 2:
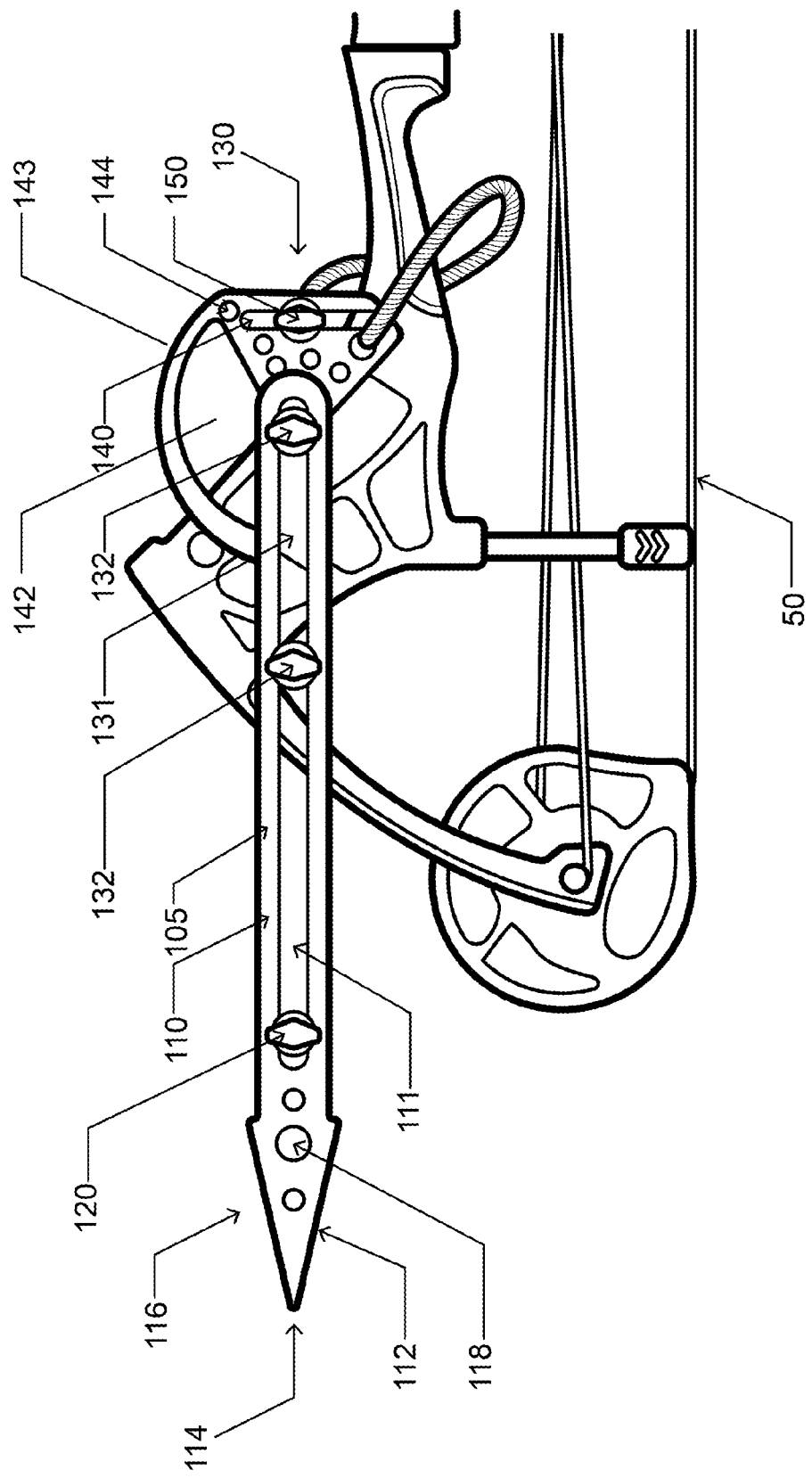
Figure 10:
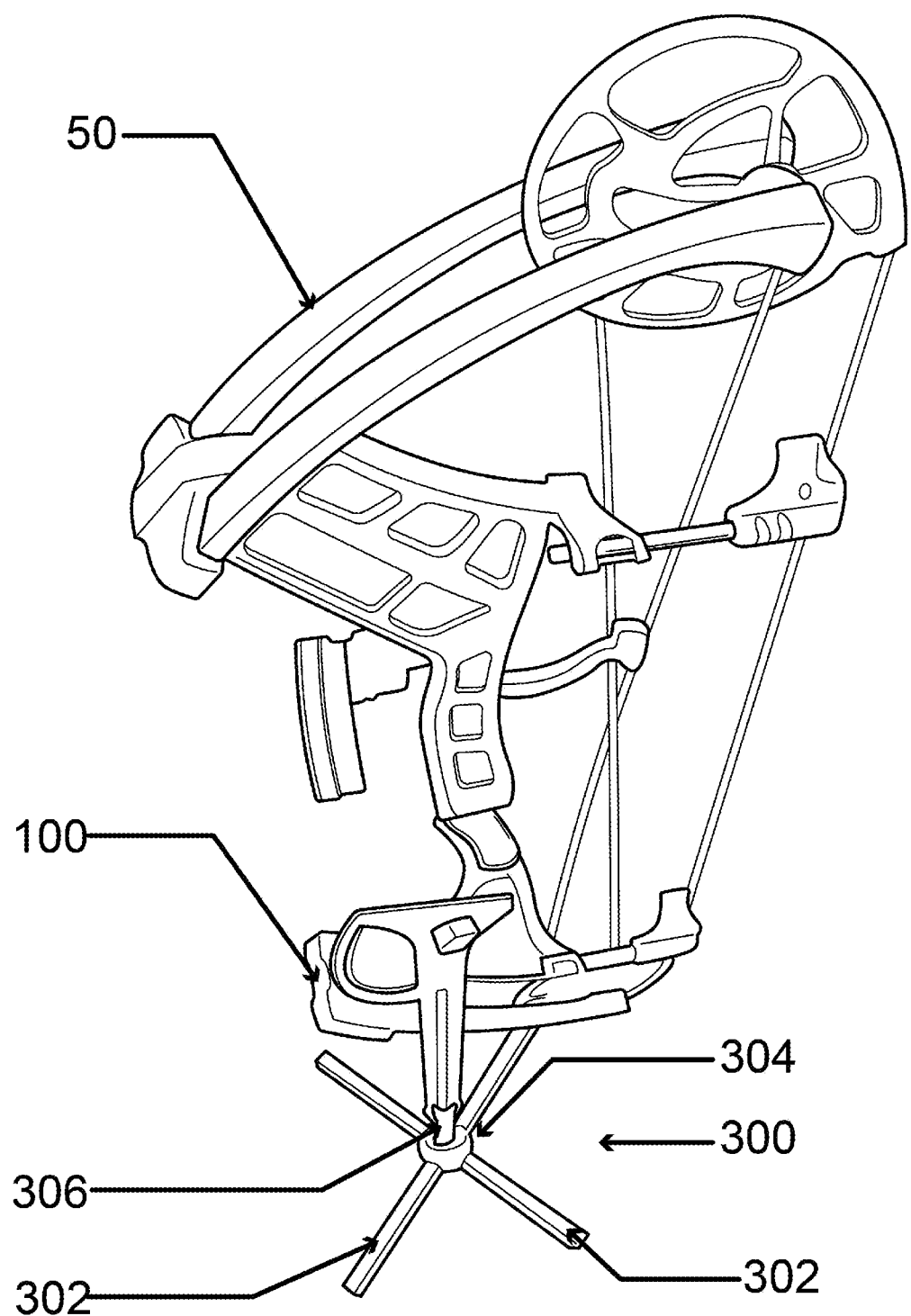
FIG. 10 shows a perspective view of a device coupled to a bow whereby the device is held by a stand, according to an exemplary embodiment of the present disclosure.

An exemplary device embodiment of the present disclosure is shown in FIGS. 1 and 2. As shown in FIGS. 1 and 2, device 100 is configured for connection (permanent or reversible coupling) to a bow 50. Considering the relatively longest dimension of bow 50 as being the length "L" of bow 50 forming a longitudinal axis, as shown in the figure, device 100 is configured to connect to bow 50 generally along the same longitudinal axis. As will become apparent in the disclosure herein, device 100 is configured so that when coupled to or part of bow 50, device 100 allows bow 50 to be rested in a relative upright position while portions of device 100, and not bow 50, touch the ground. As referenced herein, the bow 50 not touching the ground generally means that traditional portions of bows 50, such as one or more limbs or arms, cams, wheels, strings, etc. do not touch the ground when bow 50 is used with exemplary device 100 embodiments of the present disclosure and when device 100 is placed into the ground (including uneven ground), a stand 300 (as shown in FIGS. 10, 17A and 17B), or a mounting bracket 500 (as shown in FIGS. 12A and 12B), as referenced herein, to support bow 50 without any additional required assistance to support the same. Exemplary devices 100, as referenced herein, help to reduce wear and tear of a bow 50, as the vast majority of hunters and other archers commonly rest their bows 50 on the ground, against a tree, etc., which can cause damage either immediately or over time.

Exemplary devices 100, as shown in FIG. 2 for example, comprise a first portion 130 (also referred to herein as a "dagger top") and a second portion 110 (also referred to herein as a "dagger bottom"). Other device embodiments, such as shown in FIGS. 13A and 13B for example, may comprise a first portion 130 integral with a second portion 110. Second portion 110, in several embodiments, is a unitary body formed of metal, carbon fiber, plastic, and/or other materials of sufficient strength so to allow devices 100 of the present disclosure to operate as referenced herein without breaking or becoming structurally unsound. In at least one embodiment, second portion 110 (dagger bottom) and first portion 130 (dagger top) comprise aluminum or an aluminum alloy, such as 6061 or 6067 grade pre-tempered aluminum. Aluminum or an aluminum alloy may be used in various embodiments, as they are relatively lightweight as compared to other metals, sufficiently strong so to be used as described herein, and do not corrode or are resistant to corrosion. A coating 105, such as rubber, paint, plastic, and the like, can be used to coat one or more portions of device 100 so to provide additional protection and/or to introduce additional design elements to device 100.

Figure 4:
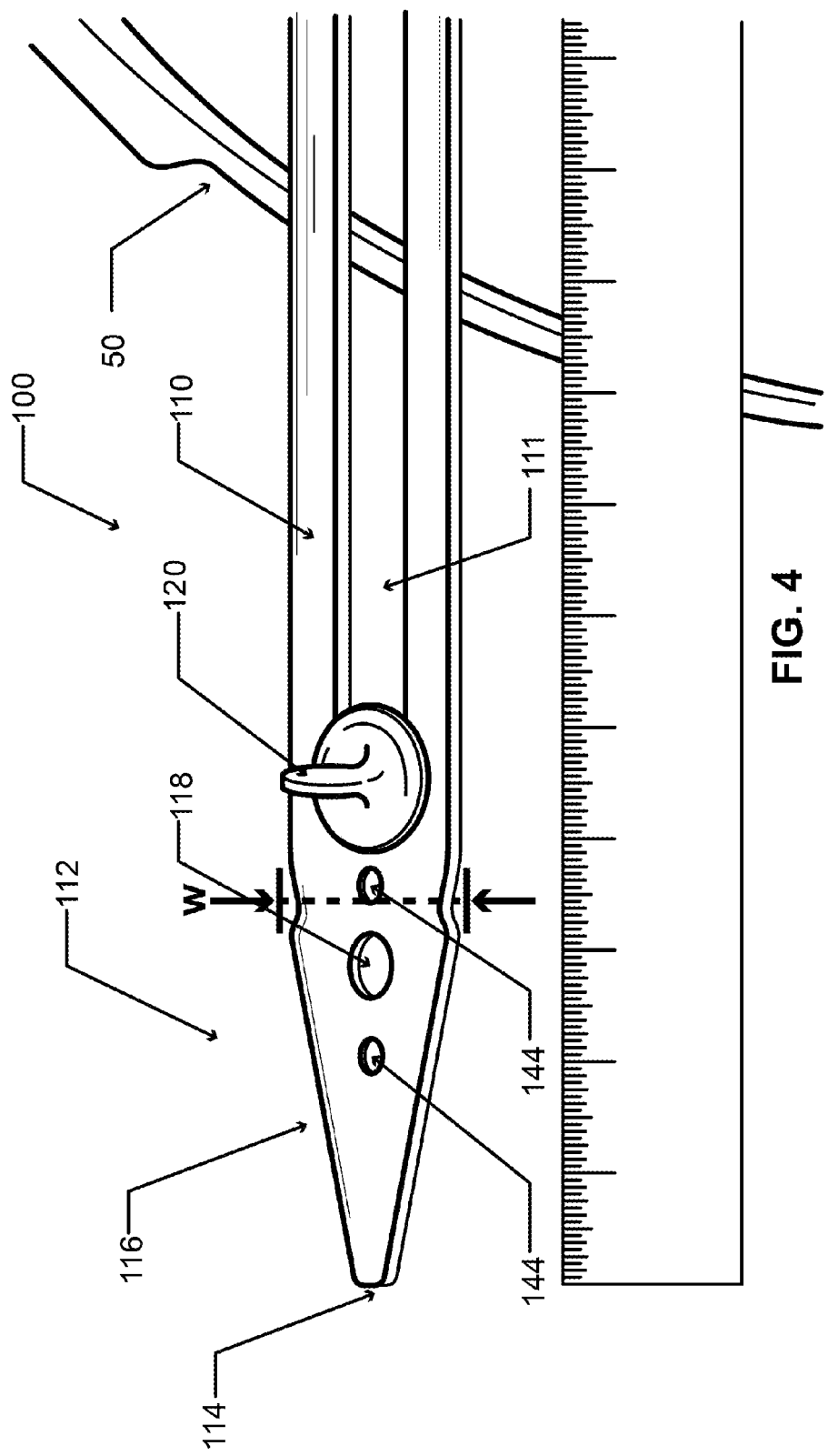
FIGS. 4 and 5 show close-up views of a distal portion of a second portion of a device, according to exemplary embodiments of the present disclosure.

Second portion 110, such as shown in FIGS. 2 and 4, has a tapered distal end 112, which can terminate at a tip 114 ranging from relatively sharp to relatively blunt (so not to easily bend and/or be dangerous to the user, for example). As shown in FIG. 4, for example, tip 114 is chiseled, whereby chiseled tip 114, as well as other tip 114 embodiments, are configured to be pressed into the ground (dirt, mud, sand, rocky ground, etc.), into a stand 300 (an exemplary base), as shown in FIG. 10, and/or into a mounting bracket 500, as shown in FIG. 12B, while bow 50 remains in a completely or relatively upright position, and more generally in line with the dimension "L" of the bow 50, without portions of bow 50 touching the ground. In various embodiments, a relatively distal portion 116 of second portion 110 (the portion of second portion 110 that includes the taper) can have a relative width "W" of 1¼ inch (1¼) at its widest point, such as shown in FIG. 4. In other embodiments, distal portion 116 can have a smaller or larger relative width at its widest point.

In various embodiments, distal portion 116 of second portion 110 can have a hanging aperture 118 defined therethrough, such as shown in FIGS. 2 and 4. Hanging aperture 118 can have various diameters, such as ¼", ⅜", ½", ⅝", or other diameters, and is configured so that when device 100 is attached to or formed as part of bow 50, bow 50 can be hung from some sort of peg, nail, screw, hook or other object, to allow bow 50 to be retained thereby without portions of bow 50 touching the ground. FIG. 16 shows an embodiment of the second portion 110 including the hanging aperture 118 at or near the tapered distal end 112. The hanging aperture 118 may have a generally hexagonal shape. In such an embodiment, the hanging aperture 118 may be sized to accept a ⁷⁄₁₆" bolt head or nut, such as those commonly used in conventional tree stands used for hunting. The hanging aperture 118 may be used to loosen, tighten and adjust parts of a tree stand using the device 100. Distal portion 116 of second portion 110 can also have one or more accessory apertures 144 defined therein, as shown in FIG. 4 and as otherwise described herein.

Figure 3:
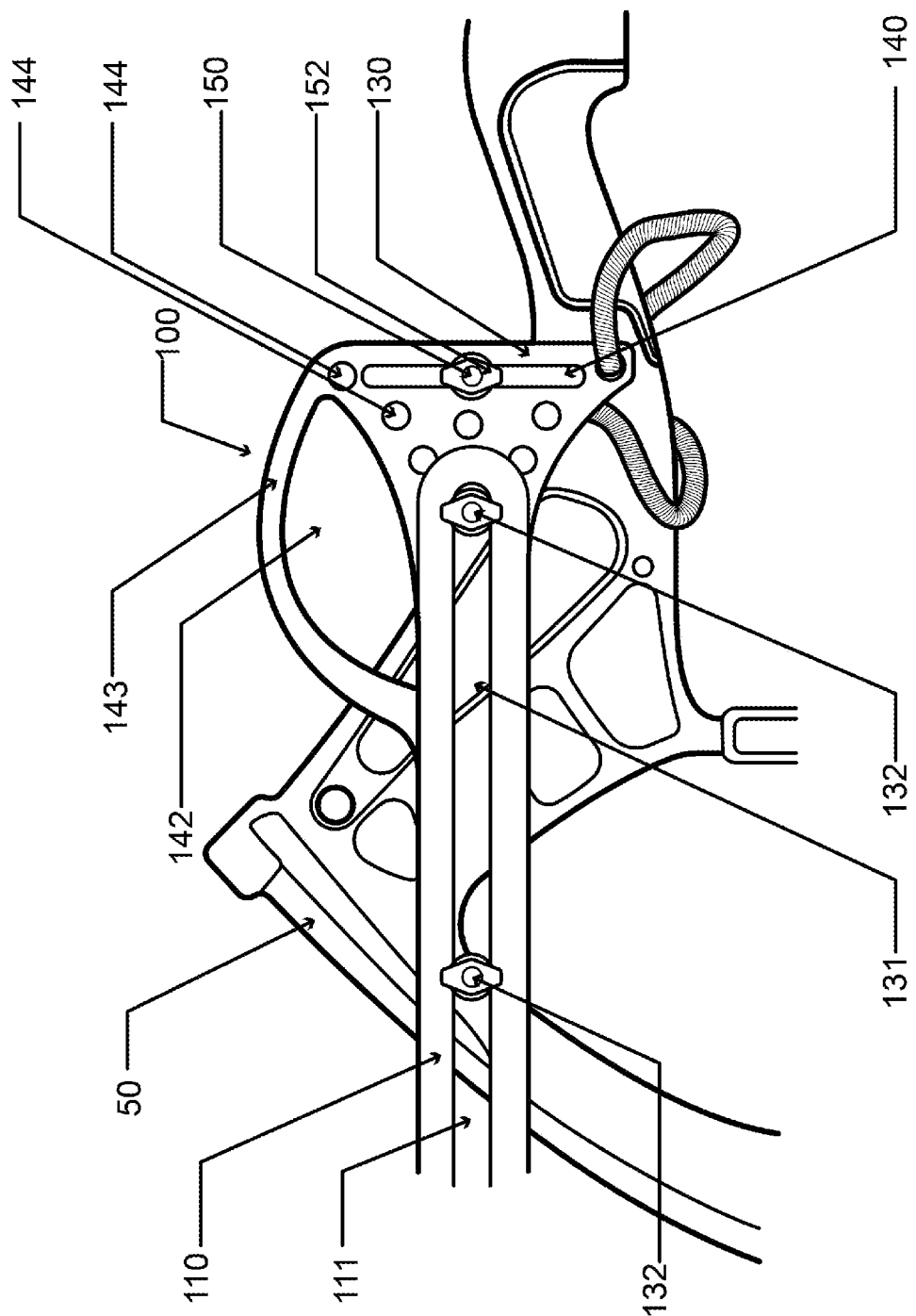
FIG. 3 shows a close-up view of a first portion of a device coupled to a bow, according to an exemplary embodiment of the present disclosure.

In several embodiments, such as shown in FIGS. 2 and 3, second portion 110 is connected to first portion 130 using one or more adjustment elements 132. Adjustment elements 132, as referenced herein, would extend through portions of second portion 110 and first portion 130, such as through a second slot 111 defined within second portion 110 and a first slot 131 defined within first portion 130, so that an overall relative length of device 100 can be adjusted as desired. First slot 131 and/or second slot 111 can be elongated, such as shown in FIGS. 2 and 3, or may comprise one of several general slots or apertures defined within second portion 110 and first portion 130 that can be used to adjust the overall relative length of device 100 by securing one or more adjustment elements 132 within said slots or apertures. In at least one embodiment, first slot 131 and second slot 111 are elongated, and adjustment elements 132 can be loosened so to allow second portion 110 to move relative to first portion 130, and tightened to secure second portion 110 relative to second portion 130 at a desired length.

Figure 6:
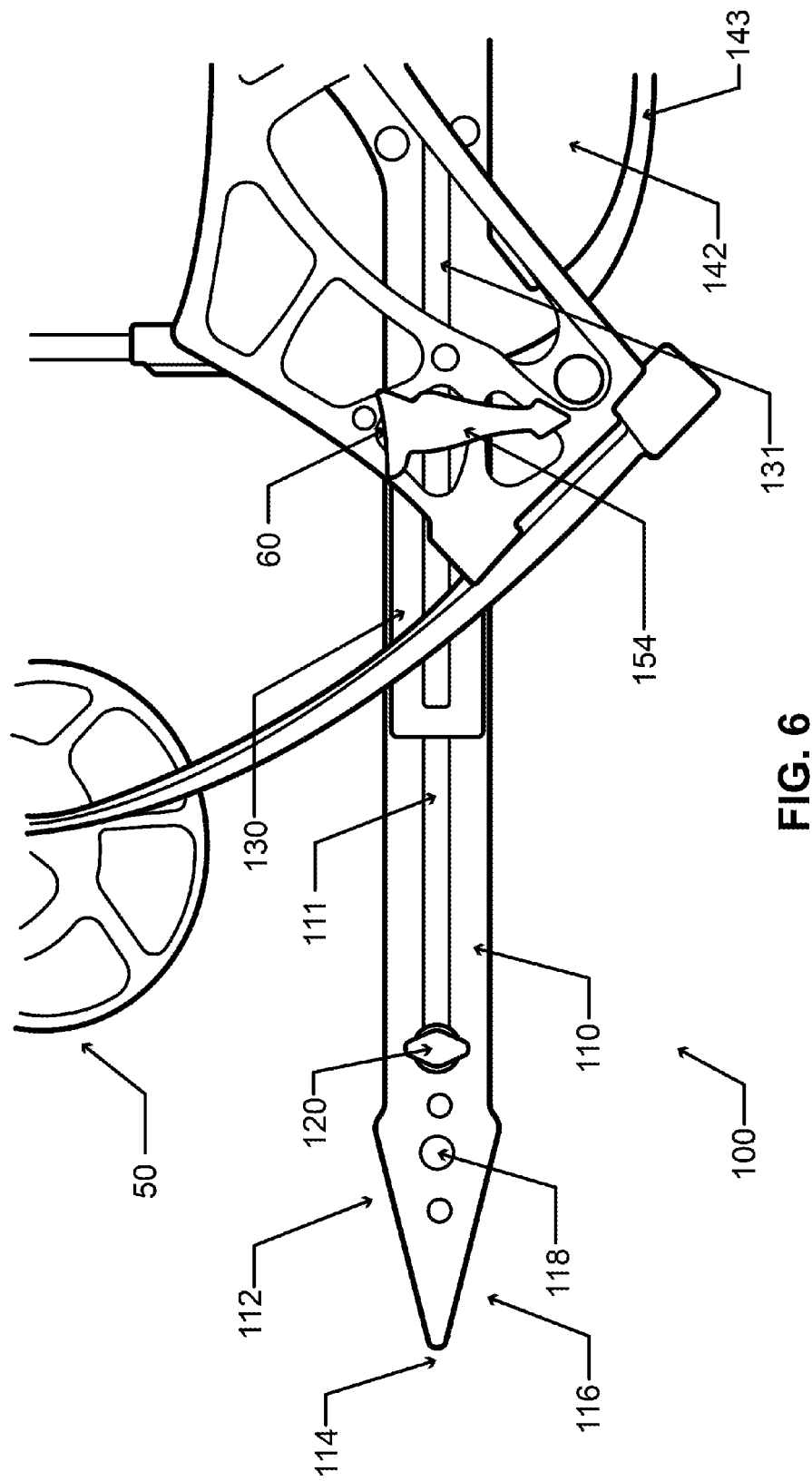
FIG. 6 shows an underside of portions of a device coupled to a bow, according to an exemplary embodiment of the present disclosure.

A peg 120, such as shown in FIGS. 2 and 4, can generally resemble an adjustment element 132 in various embodiments, but can also be its own separate embodiment configured so that when a user of device 100 steps on peg 120, the tapered distal end 112 of device 100 can be driven into the ground or into a stand 300 as referenced in further detail herein, so to allow bow 50 with device 100 to rest in a vertical position, or generally in line with the dimension "L", without portions of bow 50 touching the ground, as generally referenced herein. Peg 120, also referred to herein as an "adjustable step peg cam protector" as it is configured to be stepped upon and it protects a cam (or wheel) of a bow 50 by preventing the cam from touching the ground, can also serve as a general stop, as in various embodiments, when the user's foot touches the ground (such as when the user is pressing device 100 into the ground using peg 120), peg 120 stops the device 100 from further entering the ground because it sticks out from device 100, for example. In at least one embodiment, an exemplary distance between peg 120 and tip 114 may be about at least 4", noting that the distance can be changed by way of moving peg 120 (e.g., loosening, moving within second slot 110, and tightening) so to accommodate for more firm or loose soil or sand, for example. Should a user wish to ensure that portions of bow 50 do not touch the ground when peg 120 is adjusted within second slot 111, additional adjustments, such as by moving second portion 110 relative to first portion 130 by way of adjusting one or more adjustment elements 132, can be performed so to increase an overall length of device 100 to accommodate for a deeper insertion of tapered distal end 112 into the ground. In various embodiments peg 120 is positioned relative to other parts of device 100 so that it is ½" below the cam (wheel) of the bow 50, such as shown in FIG. 6. Other distances greater than 0" are permitted when positioning peg 120 so that peg 120 is relatively lower than the lowest part of bow 50 when bow 50 is in an upright position.

Figure 5:
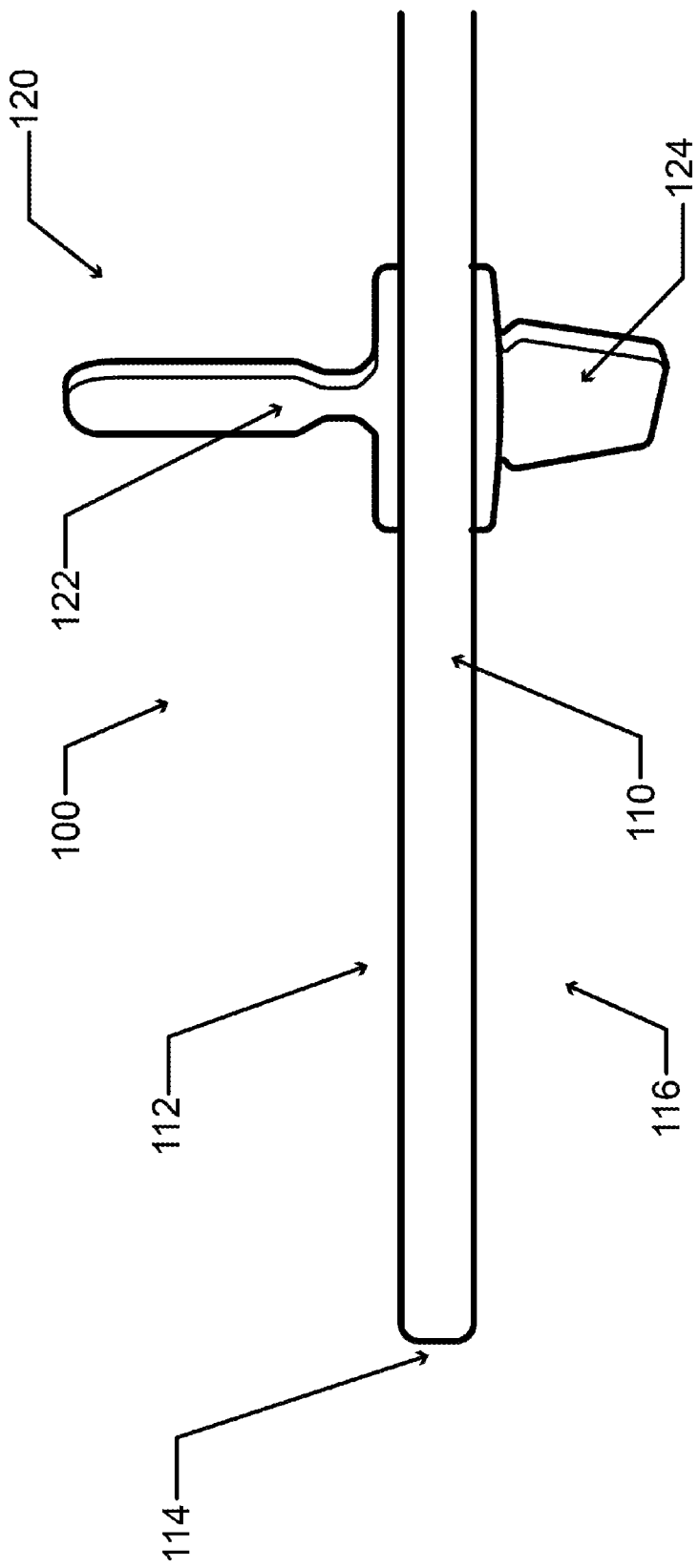

FIG. 5 shows a side view of part of an exemplary second portion 110 of the present disclosure having a peg 120 secured therein. As shown in FIG. 5, an exemplary peg 120 of the present disclosure can have a step portion 122, configured for a user to step on, and an adjustment portion 124, configured for a user to loosen and tighten as desired so to adjust the position of peg 120 relative to second portion. In at least one embodiment, the step portion 122 may be an extension nut coupled to the adjustment portion 124, which may be a carriage bolt. In such an embodiment, the step portion 122 may have a hexagonal cross-section and may be made of aluminum or steel material.

As further shown in FIG. 5, second portion 110 (as well as first portion 130, not shown in the figure), can be relatively flat, as compared to having a relatively round outer perimeter, so to increase the overall integrity of device 100 when second portion 110 is secured to first portion 130 using adjustment elements 132, for example, and/or to prevent/reduce pivot movement that may be caused by wind, for example. Such a flat profile provides an overall sleek design, and when used for bow 50 stabilization, as referenced herein, device 100 remains sleek and aligned with bow 50 and does not stick out or otherwise obstruct the safe use of bow 50. FIGS. 14A-14C depict such an embodiment of the device 100. As shown in FIGS. 14B and 14C the first portion 130 and the second portion 110 are relatively flat and are configured to be adjustably secured adjacent one another by adjustment elements 132 (not shown). As shown in FIG. 14B, the first portion 130 may have a length "L130" of about 12", and the second portion 110 may have a length "L110" of about 15". In such an embodiment, the overall length "L100" of the device 100 may be adjusted through a range of approximately 15"-25". As shown in FIG. 14C, a thickness "D110" of the second portion 110 may be greater than a thickness "D130" of the first portion 130. In such an embodiment, the thickness D110 may be greater than the thickness D130 to provide increased strength and resistance to bending, particularly at the tapered distal end 112 and the tip 114 which are structured to be driven into the ground or a mounting bracket, while the first portion 130 may be configured to be lighter and thus reduce the overall mass of the device 100.

Adjustment elements 132 can also be made of various materials, such as metal, plastic, carbon fiber, etc., and can either be adjustable using a traditional tool (such as a screwdriver or wrench, for example), or, in various embodiments, can be adjustable by hand, such as adjustment element 132 embodiments using a wing-nut or other object used in the art to tighten and/or loosen a threaded object, for example. Adjustment elements 132 are not limited to knobs that turn, for example, as other objects, such as various latches, levers, couplers, etc., that can be relatively loosened/opened and relatively tightened/closed can comprise adjustment elements 132 of the present disclosure. Accordingly, various device 100 embodiments can be assembled (as may be needed) and/or coupled to a bow 50 without the use of tools (no tools necessary).

As shown in various figures, first portion 130 is the portion of device 100 that connects to, or forms part of, bow 50. For example, and as shown in FIGS. 2 and 3, first portion 130 defines an attachment aperture 140 configured to correspond to a bow aperture 60 defined within bow 50 (as shown in FIG. 6, for example), such as within a riser bracket of bow 50 or another part of bow 50. As the vast majority of bows 50 manufactured today have a bow aperture 60 defined within bow 50, attachment aperture 140 can be aligned with bow aperture 60, and an attachment mechanism 150, such as a knob or other mechanism as described in connection with various adjustment element 132 embodiments referenced herein, can be tightened, closed, or otherwise secured so to attach first portion 130 with bow 50. Attachment aperture 140 can itself be elongated (such as a slot), as shown in FIGS. 2 and 3, so to allow adjustment so part of the overall weight of the bow 50 plus device 100 is relatively forward to help with overall stabilization. As different bows 50 have limbs/arms of various widths, the configuration of attachment aperture 140 allows for a single device 100 embodiment to be suitably mounted to any number of different bow 50 embodiments/configurations. In at least one embodiment, attachment aperture 140 is at or near 2" in length.

Figure 11:
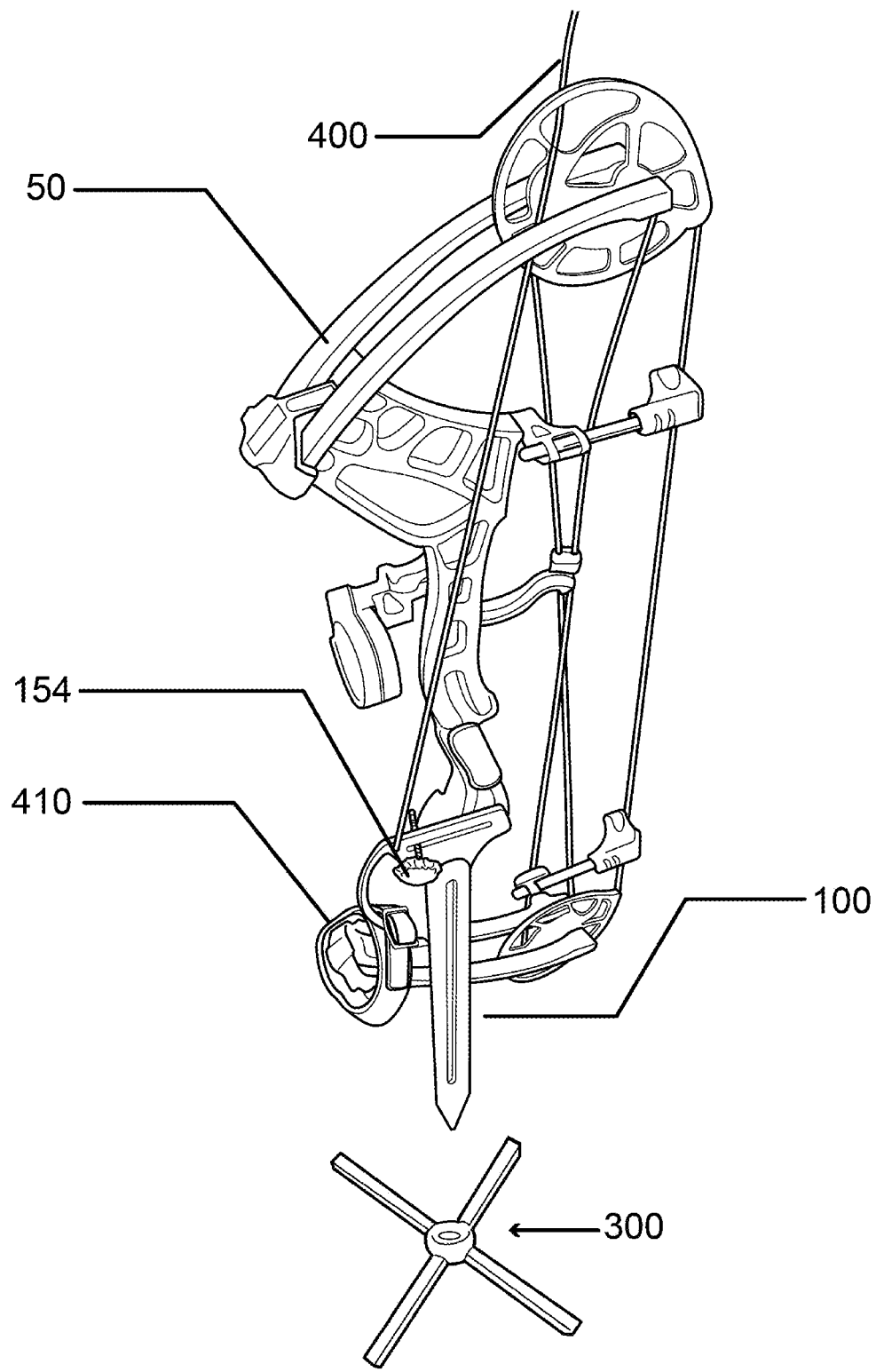
FIG. 11 shows a perspective view of a device coupled to a bow and being elevated above the ground vertically using a rope, according to an exemplary embodiment of the present disclosure.

Bow apertures 60 are generally used by archers to add weights and/or horizontally-extending stabilizers, which can range in length from several inches to several feet in length. In other embodiments, for example, first portion 130 (or a unitary portion, as referenced herein) can be permanently attached to, or form part of, bow 50. In embodiments of devices 100 that are secured to bows 50, for example, such device embodiments 100 can be sold or provided separately from bows 50 and subsequently attached to bows 50. Attachment mechanisms 150, such as shown in FIG. 3, can have an adjustment portion 152 (used to connect and disconnect device 100 from bow 50) and a head portion 154, such as shown in FIG. 6, whereby adjustment portion 152 is on one side of device 100 and head portion 154 is on another side of device 100. Head portion 154, as well as portions of adjustment elements 132 and/or pegs 120, can be decorative, such as, for example, designed as a smaller version of a device 100 (as shown in FIG. 6), part of a deer antler (as shown in FIG. 11), or other designs (sports logos, vehicle logos, etc.) as desired. Head portion 154 can also be relatively elongated, such as shown in FIG. 6, so to allow use of the same with various bows 50 having various bow aperture 60 locations and configurations. In at least one embodiment, the head portion 154 may be a hook that extends through a bow aperture 60 and engages a portion of the bow 50 to facilitate securing the device 100 to the bow 50. In such an embodiment, the head portion 154 may be covered or coated in rubber, foam, or other suitable resilient material to provide vibration dampening and reduction to the interface between the head portion 154 and the bow 50.

Figure 15A:
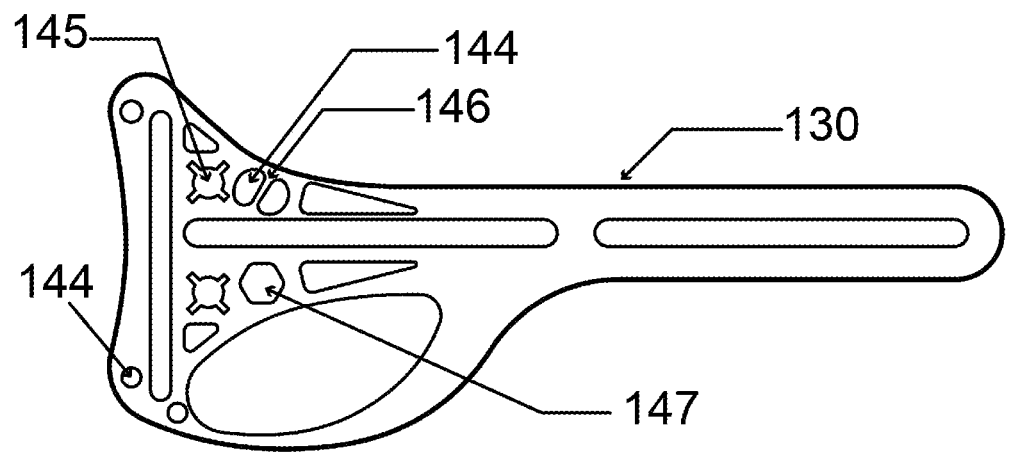
FIG. 15A shows a plan view of a first portion of a device, according to an exemplary embodiment of the present disclosure.
Figure 15B:
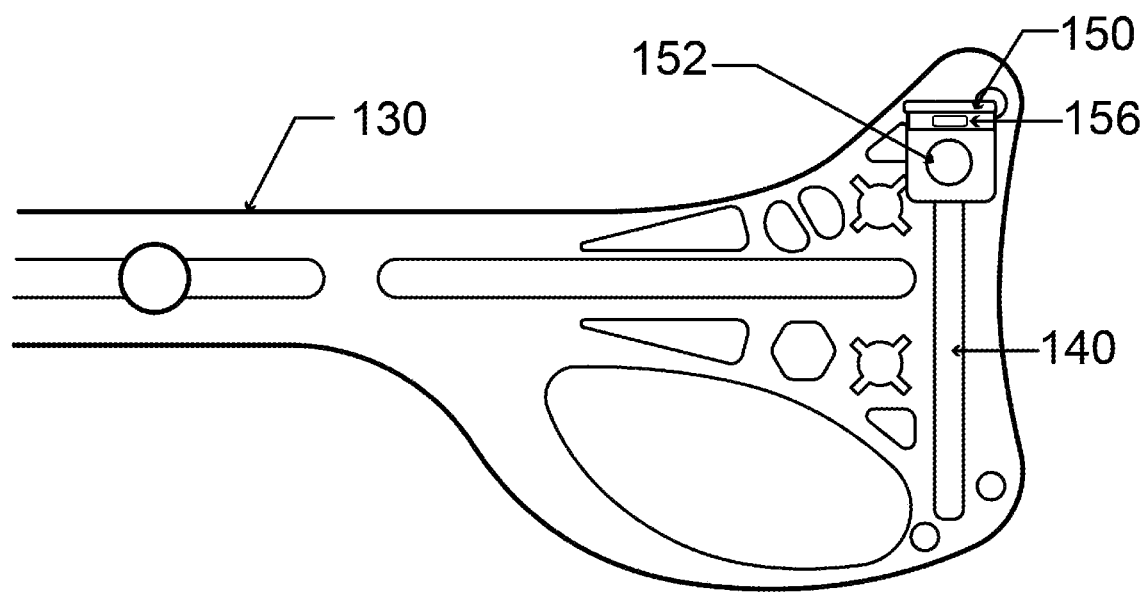
FIG. 15B shows a detailed plan view of a first portion of a device, according to an exemplary embodiment of the present disclosure.

FIG. 15B shows an embodiment of the attachment mechanism 150 and adjustment portion 152 attached to the first portion 130 through the attachment aperture 140. As shown in FIG. 15B, the attachment mechanism 150 may include an L-shaped bracket having an attachment aperture 156 formed through a portion of the attachment mechanism 150 that extends generally perpendicular from the first portion 130. The position of the attachment mechanism 150 may be adjusted within the attachment aperture 140 using the adjustment portion 152, thus enabling the attachment mechanism 150 to be configured to couple to a wide variety of different bows 50. In at least one embodiment, the attachment mechanism 150 may be structured to couple to a factory riser stabilizer mount. In such an embodiment, the attachment aperture 156 may be sized to accept a conventional 5/16", 24 thread stabilizer.

Various embodiments of first portions 130, as shown in FIGS. 2, 3, and 6, for example, can define a handle aperture 142, defined in part by handle rib 143 and other portions of second portion 110, whereby handle aperture 142 is sized and shaped so that a user of device 100, for example, can grab device 100 with his or her hand by inserting one or more fingers into handle aperture 142. Various accessory apertures 144, such as shown in FIGS. 2 and 3, can be defined within first portion 130 and/or second portion 110, and used to receive various accessories and/or to generally reduce the overall weight of device 100. Various weights can be added to accessory apertures 144, as desired. Accessories 410, such as releases used to release a string of a bow 50 when shooting an arrow shown in FIG. 11, can be retained within handle aperture 142, for example, so to minimize additional wear and tear to bow 50 when such an accessory is retained using a portion of bow 50, such as at a string. Accessory apertures 144 can also be used to retain various accessories 410 (as shown in FIG. 11), such as string releases, cameras, and the like.

Figure 7:
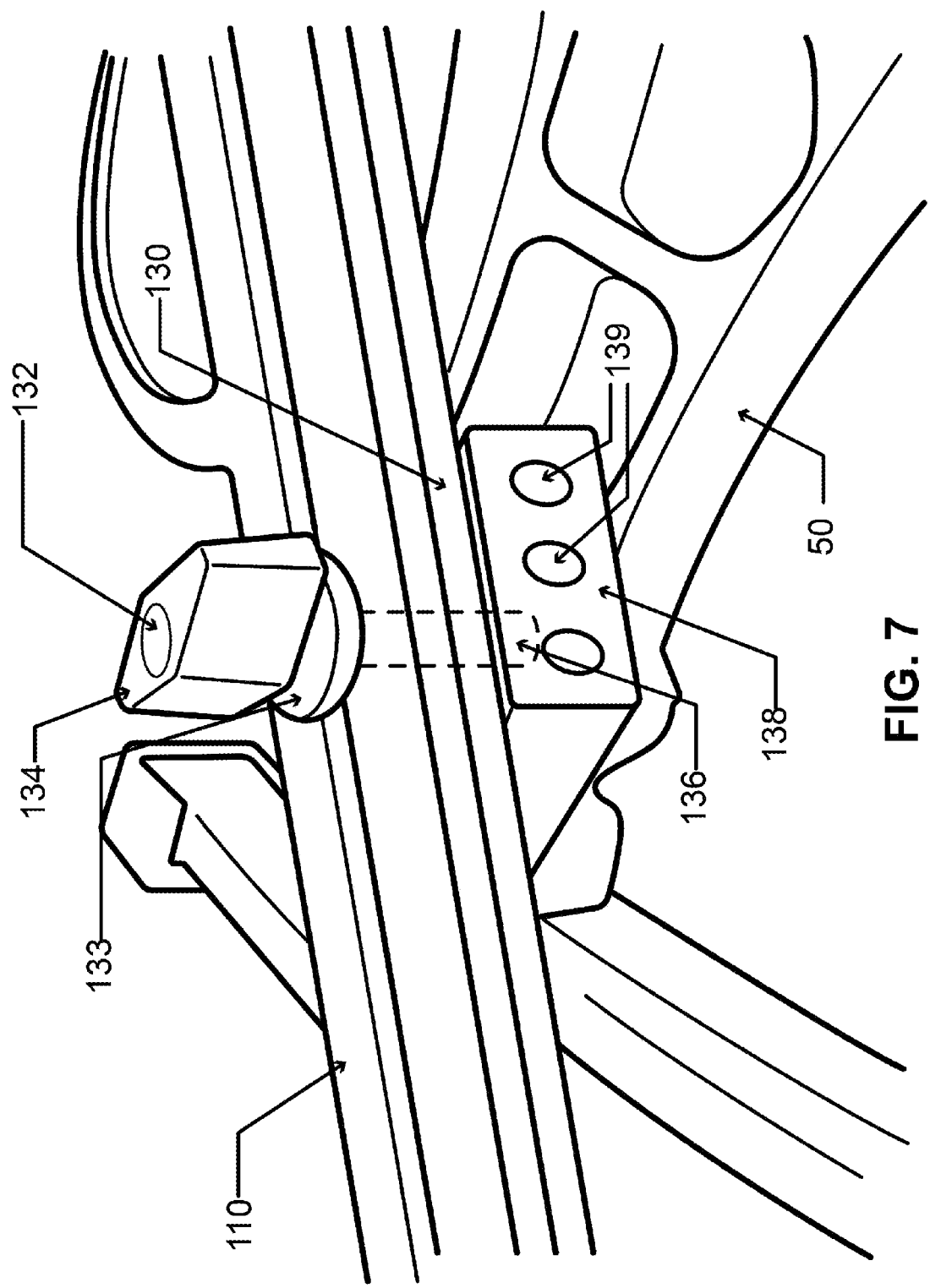
FIG. 7 shows a close-up perspective view of portions of a device, a block, and a bow, according to an exemplary embodiment of the present disclosure.

FIG. 15A shows an embodiment of the first portion 130. In such an embodiment, the first portion 130 may include at least one accessory aperture 145 that is structured as a broadhead wrench capable of accepting an arrow broadhead (i.e., tip). Such an accessory aperture 145 may be configured to accept 2-, 3- or 4-blade broadheads, or any desired number of blades, and enables the user to tighten and loosen broadheads for repair or replacement using the device 100. The first portion 130 may further include an accessory rib 146 formed between two or more accessory apertures 144. The accessory rib 146 may be configured to accept an arrow nock (i.e., a notch in the distal end of a conventional arrow). Such an accessory rib 146 enables the user to tighten and loosen arrow nocks for repair or replacement using the device 100 without twisting a string of the bow 50. The first portion 130 may further include an accessory aperture 147 having a generally hexagonal shape. In at least one embodiment, the accessory aperture 147 may be sized to accept the peg 120 to enable loosening, tightening and adjustment of the peg 120 using the device 100. The first portion 130 may further include one or more accessory apertures 144 sized to enable a camera, such as a video or digital camera (e.g., a GoPro® camera), to be mounted to the first portion 130. In at least one embodiment, the accessory apertures 144, 145 and 147 may be configured to enable any desired accessory to be mounted to the first portion 130 including, but not limited to, a flashlight, a sight, a compass, a global positioning transceiver, and the like. FIG. 7 shows a close-up perspective view of portions of an exemplary device 100 of the present disclosure. As shown therein, second portion 110 is secured to first portion 130 by way of an adjustment element 132, which may be configured as having an adjustment portion 134 (such as a portion a user would grip to turn, for example), and a threaded portion 136 (also referred to as part of a "riser bolt") inserted into first slot 131 and second slot 111 and into part of bow 50, as may be desired. FIG. 7 also shows the use of various vibration dampeners, such as one or more blocks 138 (also referred to herein as shock and/or vibration reducing blocks) and one or more washers 133 (also referred to herein as shock and/or vibration reducing washers). Blocks 138 and/or washers 133 can comprise various compressible materials, such as foam, rubber, foam rubber, plastic, and the like, so to reduce vibration and/or shock when bow 50 is used to shoot an arrow, for example. Likewise, the various adjustable features and elements of the device 100, such as but not limited to the peg 120 and its adjustment portion 124, the adjustment elements 132, the adjustment mechanism 150 and its adjustment portion 152, and the head portion 154, may comprise compressible materials, such as foam, rubber, foam rubber, plastic, and the like, so to reduce vibration and/or shock when bow 50 is used. Further, threads of such features and elements, for example the threaded portion 136 and the adjustment portion 124, may include polytetrafluoroethylene (PTFE, i.e., Teflon®) coating to further reduce and attenuate vibration.

Figure 8:
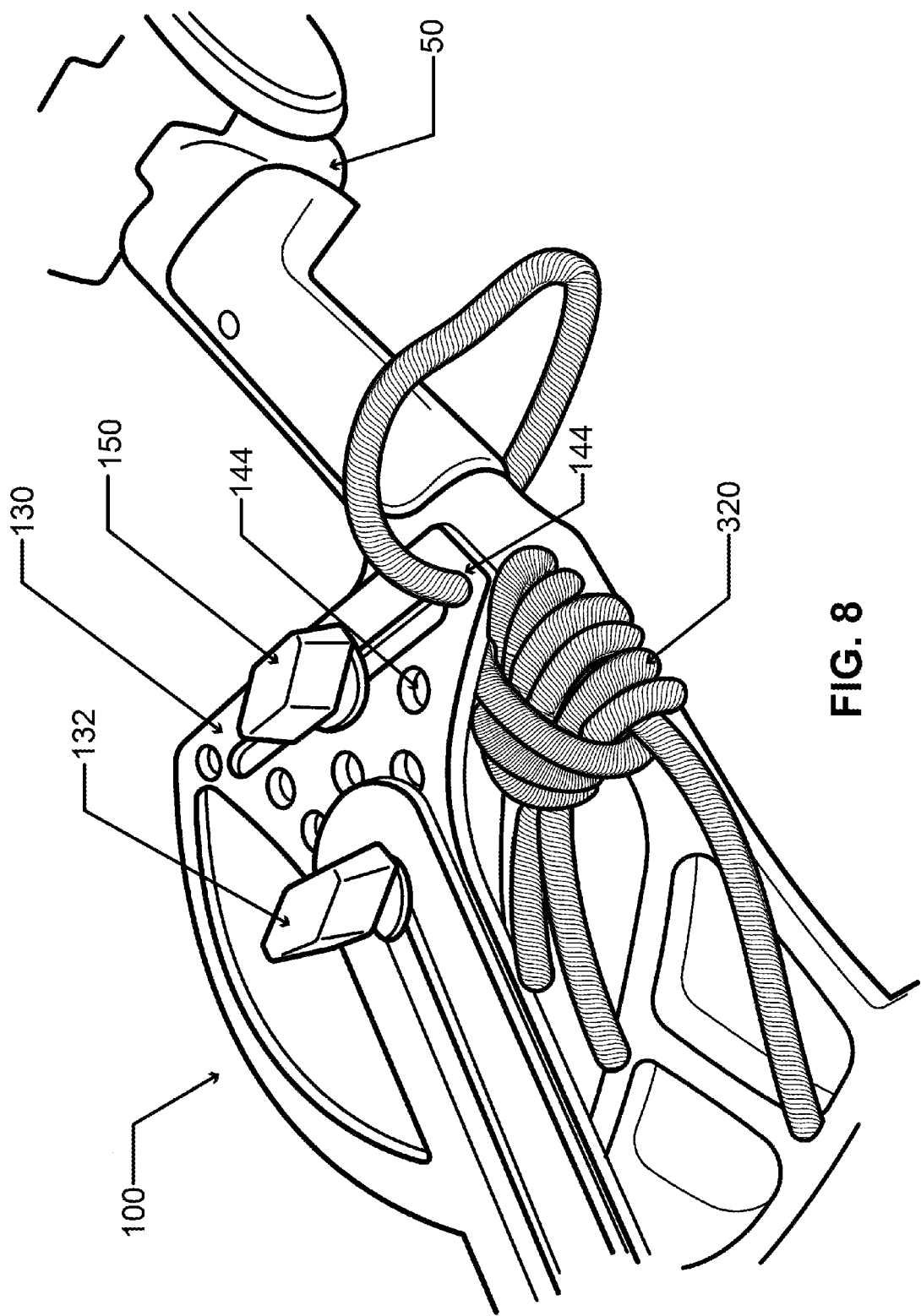
FIG. 8 shows a close-up perspective view of a wrist sling connected to a device, according to an exemplary embodiment of the present disclosure.

Various holes 139 can be present/defined within block 138 embodiments, for example, to reduce an overall weight of the same. As shown in FIG. 7, for example, one or more washers 133 can be used between adjustment portion 134 of adjustment element 132 and second portion 110 for example. One or more blocks 138 can be used between second portion 110 and bow 50, for example, as shown in FIG. 7. Blocks 138 can have various thicknesses, such as ⅝", ⅞", 1", and smaller or larger thicknesses, and multiple blocks 138 can be used as desired so to form the proper alignment of device 100 with bow 50. In at least one embodiment, the block 138 may be cylindrically shaped. In certain embodiments, the threaded portion 136 of the adjustment element 132 may extend through the block 138 and form a retention feature, such as the head portion 154, to couple to the bow 50. For example, the threaded portion 136 may be attached to or integral with the head portion 154. In such an embodiment, the threaded portion 136 may be included in the attachment mechanism 150, the adjustment element 132 or the adjustment portion 152. FIG. 8 shows a close-up view of part of a device 100, whereby a wrist sling 320 is connected to device 100. As shown therein, an exemplary wrist sling 320 configured as a rope is tied to device 100 using one of the accessory apertures 144 defined within first portion 130, and provides a user of bow 50 an additional element useful to retain the same in a comfortable and safe fashion. In addition, and as shown in FIG. 8, one or more weights 250 can be added to device 100, such as at one or more accessory apertures 144, so to improve the overall balance and/or stabilization of the combination of bow 50 and device 100.

In various embodiments, devices 100 operate as vertically mounted stabilizers, generally being aligned with an overall length of bow 50. As noted above, and considering the relatively longest dimension of bow 50 as being the length "L" of bow 50 forming a longitudinal axis, as shown in FIG. 1, device 100 is configured to connect to bow 50 generally along the same longitudinal axis. Such a device 100 then serves as a stabilizer that remains attached to bow 50 even when bow 50 is not in use, and given its overall vertical positioning relative to bow 50 (when bow 50 is held vertically, such as when hunting deer, for example), device 100 allows the user to move bow 50 from side to side without a conventional stabilizer, generally protruding in a non-vertical direction, getting in the way, such as by hitting a tree or other forest brush.

Figure 9:
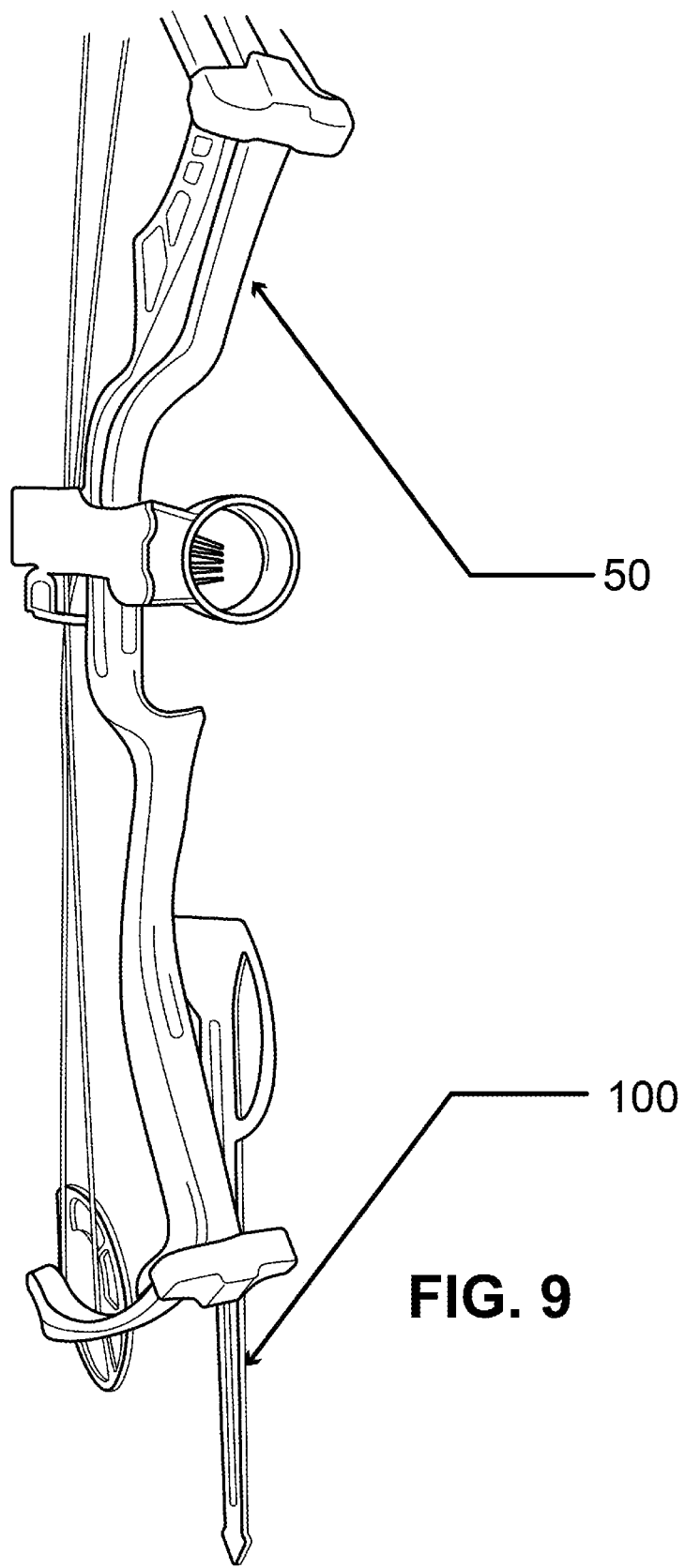
FIG. 9 shows vertical counter-weight stabilization of a device and a bow coupled together, according to an exemplary embodiment of the present disclosure.

In general, it is desirable to have a larger portion of the overall weight on the lower half of bow 50 when bow 50 is held in a vertical/upright position, such as shown in FIG. 9.

As shown in various embodiments, the vast majority of device 100 is mounted on one relative side of bow 50, such as on the left side of bow 50 for a right-handed shooter. Such positioning helps to best balance bow 50 in the user's hands, such as shown in FIG. 9. Therefore, in various embodiments, device 100 counterbalances other elements of bow 50 or objects/accessories coupled thereto, such as sights, grips, etc. Accordingly, various embodiments of devices 100, as referenced herein, act as counter-weight stabilizers of a bow 50 with a device 100 coupled thereto. In such embodiments, the device 100 may provide 100% counter-balancing with parallel stabilization with pendulum effect when the bow 50 is in use.

An exemplary embodiment of a device 100 positioned within a stand 300 is shown in the perspective view shown in FIG. 10. As shown therein, device 100, coupled to or formed as part of bow 50, is retained in a vertical position using a stand 300 of the present disclosure. Stands 300, such as shown in FIG. 10, comprise a base portion which may include one or more legs 302 or another suitable base portion configuration, and a riser portion 304 defining a riser aperture 306 therein (whereby riser portion 304 with riser aperture 306 also being referred to herein as a "slotted dagger mount"), whereby the riser aperture 306 is sized and shaped to receive the distal portion 116 of second portion 110 of device 100. In use, a user can position the tip 114 of second portion 110 into riser aperture 306 and press downward or otherwise allow the weight of the bow 50 plus device 100 to cause tip 114 to enter into riser aperture 306 so to be retained by stand 300. Removal of device 100 (and therefore bow 50) from stand 300 can be accomplished by, for example, stepping on stand 300 and pulling bow 50 upward.

FIG. 17A shows an alternative embodiment of the stand 300, including the riser portion 304. The stand 300 may include a base surface 310 connected to one or more of the legs 302. As shown in FIG. 17A, the base surface 310 may be generally circular in plan view and may circumferentially connect two or more of the legs 302 to provide strength and stability to the stand 300. In such an embodiment, the base surface 310 may be about 12" in diameter. Alternatively, the base surface 310 may connect two or more of the legs 302 with one or more straight members extending therebetween. The base surface 310 may be configured to facilitate removal of the bow 50 from the stand 300 by enabling the user to step on the base surface 310 while pulling the bow 50 from the stand 300. As shown in FIG. 17B, the riser 304 may extend from one or more legs 302 or the base surface 310. In such an embodiment, the riser 304 may include an upper portion 308, defining an upper riser aperture 306 therethrough, connected to a lower portion 309, defining a lower riser aperture 307 therethrough, by a back portion 303 extending between the upper portion 308 and the lower portion 309. Upper riser aperture 306 and lower riser aperture 307 are sized and shaped to receive at least a part of a distal portion 116 of the second portion 110 of the device 100 therethrough. The riser 304 may be disposed above the base surface 310 such that the base surface 310 nor legs 302 interfere with the tip 114 of the second portion 110 when the device 100 is placed in the stand 300. In such an embodiment, the lower portion 309 or the back portion 303 may extend to the base surface 310 or the one or more legs 302 to offset the lower riser aperture 307 from the ground.

FIG. 11 shows another perspective view of a bow 50 having a device 100 coupled thereto, but as shown in the figure, bow 50 and device 100 are being suspended vertically using a rope 400 coupled to device 100. As demonstrated therein, a rope 400 can be connected/tied to device 100, and when the user lifts the rope, such as to climb a tree to get to a tree stand, bow 50 remains in a relatively upright (vertical) position so not to get caught in branches, etc., when the user is climbing the tree and holding the rope 400.

FIG. 12A shows an inside view, and FIG. 12B shows a side perspective view, of an exemplary universal mounting bracket 500 of the present disclosure. As shown therein, an exemplary mounting bracket 500 is configured for mounting to part of an object 550, such as part of a tree stand, so to retain bow 50 using device 100. In an exemplary embodiment of a mounting bracket 500 of the present disclosure, mounting bracket has an upper portion 502 defining an upper aperture 504 therethrough, and a lower portion 506 defining a lower aperture 508 therethrough. Upper aperture 504 and lower aperture 508 are sized and shaped to receive at least a part of the distal portion 116 of the device 100 therethrough, as shown in FIG. 12A. Mounting bracket 500 can be retained by object 550 such as by using one or more U-bolts 510, with the ends of U-bolts 510 extending into an inner portion of mounting bracket 500, such as shown in FIG. 12B, so to be retained using fasteners 512, such as wing nuts, as shown in FIG. 12A. A back portion 503 can extend from upper portion 502 to lower portion 506, for example. When mounting bracket 500 is mounted/secured to object 550, mounting bracket 500 operates similar to an exemplary stand 300 of the present disclosure, being able to retain device 100 coupled to bow 50 so to ultimately retain bow 50 without additional assistance. Multiple U-bolts 510 can be used to increase the overall stability of mounting bracket 500 relative to object 550. Mounting brackets 500, as referenced herein, may be "universal" in nature as they can couple to various types of objects 550, such as those referenced herein and others.

In other embodiments, such as those where a general height adjustment is not present, or where a device 100 embodiment with fewer parts is employed, a unitary portion/plate (one of second portion 110 or first portion 130) can be coupled to or formed as part of bow 50 and configured to permit bow 50 to rest upright while not touching the ground (as the second portion 110 or first portion 130 actually touches the ground or a stand 300 that rests on the ground). In such an embodiment, such as shown in FIGS. 13A and 13B, the unitary portion/plate includes components and/or features of exemplary second portions 110 and first portions 130 of the present disclosure, such as a tapered distal end 112 terminating at a tip 114, a peg 120, and an attachment aperture 140 defined therein.

In at least one embodiment, bow 50 is configured so that device 100 is incorporated into bow 50 at the time of manufacture of bow 50. Such an overall embodiment would be referred to as an exemplary system 75 as generally referenced herein. System 75 is identified in FIG. 1, noting that in such an embodiment, system 75 comprises device 100 and bow 50 that may or may not be incorporated into one unitary mechanism at the time of manufacture. As referenced herein, system 75 may include device 100 plus an additional element, such as a bow 50, a stand 300, a rope 400, one or more accessories 410, a wrist sling 320, and/or a mounting bracket 500.

In other embodiments, devices 100 of the present disclosure are configured for coupling to a firearm, such as a rifle or pistol, retaining the same above the ground, within a stand 300, or within a mounting bracket, as generally referenced herein.

Furthermore, various devices 100 of the present disclosure can comprise various colors and/or patters, such as solid colors, camouflage patterns, and the like.

While various device and system embodiments and methods of using the same have been described in considerable detail herein, the embodiments are merely offered as non-limiting examples of the disclosure described herein. It will therefore be understood that various changes and modifications may be made, and equivalents may be substituted for elements thereof, without departing from the scope of the present disclosure. The present disclosure is not intended to be exhaustive or limiting with respect to the content thereof.

Further, in describing representative embodiments, the present disclosure may have presented a method and/or a process as a particular sequence of steps. However, to the extent that the method or process does not rely on the particular order of steps set forth therein, the method or process should not be limited to the particular sequence of steps described, as other sequences of steps may be possible. Therefore, the particular order of the steps disclosed herein should not be construed as limitations of the present disclosure. In addition, disclosure directed to a method and/or process should not be limited to the performance of their steps in the order written. Such sequences may be varied and still remain within the scope of the present disclosure.

The invention claimed is:

1. A device for supporting an archery bow, comprising:
a first portion configured for attachment to the archery bow; and
a second portion configured for attachment to the first portion, the second portion having a distal tip opposite the first portion and configured for insertion into the ground;
an adjustment element, the adjustment element structured to reversibly and adjustably connect the first portion to the second portion;
an attachment mechanism structured to reversibly and adjustably attach the device to the archery bow; and
a peg attached to the second portion at or near the distal end, the peg structured to accept a generally vertical load;
wherein the device is structured to retain the archery bow above the ground without the archery bow touching the ground;
wherein the adjustment element is disposed in a first slot and a second slot, the first slot defined through and extending axially along the first portion, and the second slot defined through and extending axially along the second portion, and wherein the adjustment element is disposed in the first slot and the second slot; and
the first slot disposed axially along the first portion such that the adjustment element may be disposed in at least two different positions relative to the first portion.

2. The device of claim 1, wherein in the adjustment mechanism comprises a block disposed between the first portion and the archery bow and a head portion configured to engage the archery bow, wherein the block comprises a compressible, vibration-dampening material.

3. The device of claim 2, wherein the head portion comprises a hook.

4. The device of claim 1, wherein the attachment mechanism comprises a bracket extending generally perpendicular from the first portion, the bracket comprising a bracket slot therethrough configured to accept a riser stabilizer mount.

5. The device of claim 1, wherein the first portion further comprises a handle rib defining a handle aperture therethough, the handle aperture sized and shaped to receive one or more fingers of a user of the device.

6. The device of claim 1, wherein adjustment of the adjustment element permits an effective length of the device to be adjusted by way of loosening the adjustment element, moving the first portion relative to the second portion, and tightening the adjustment element.

7. The device of claim 1, comprising part of a system, the system further comprising the archery bow.

8. An apparatus for supporting an archery bow, comprising:
a first portion having a first slot defined therein;
a second portion having a second slot defined therein, the second portion disposed adjacent the first portion such that the first slot and the second slot at least partially align, wherein the second portion includes a proximal end and a distal end, the proximal end disposed adjacent the first portion and the distal end terminating in a tapered distal tip, the distal tip configured to retain the apparatus in the ground;
an adjustment element disposed in the first slot and the second slot, the adjustment element structured to adjustably secure the first potion to the second portion;
the first slot disposed axially along the first portion such that the adjustment element may be disposed in at least two different positions relative to the first portion;
an attachment mechanism structured to adjustably secure the first portion and the second portion to the archery bow; and
a peg attached to the second portion at or near the distal end, the peg structured to accept a generally vertical load;
wherein the apparatus is configured to retain the archery bow attached thereto in a substantially vertical position when the distal tip is inserted into the ground.

9. The apparatus of claim 8, wherein in the adjustment mechanism comprises a block disposed between the first portion and the archery bow and a head portion configured to engage the archery bow, wherein the block comprises a compressible, vibration-dampening material.

10. The apparatus of claim 8, herein the first portion has a first width and the second portion has a second width, and wherein the second width is greater than the first width.

11. The apparatus of claim 8, wherein the first portion further comprises a handle aperture and at least one accessory aperture.

12. The apparatus of claim 8, wherein the attachment mechanism comprises a bracket extending generally perpendicular from the first portion, the bracket comprising a bracket slot therethrough configured to accept a riser stabilizer mount.

13. The apparatus of claim 8, comprising part of a system, the system further comprising the archery bow.

14. A device for supporting an archery bow, comprising:
a first portion with a first slot, including an attachment aperture;
a second portion with a second slot, configured for attachment to the first portion, the second portion having a distal tip at or near a distal end of the second portion opposite the first portion, the distal tip configured for insertion into the ground;
an adjustment element disposed in the first slot and the second slot, the adjustment element structured to adjustably secure the first portion to the second portion;
the first slot disposed axially along the first portion such that the adjustment element may be disposed in at least two different positions relative to the first portion;
an attachment mechanism through first and second slots structured to adjustably secure the first portion and the second portion to the archery bow; and
a peg attached to the second portion at or near the distal end, the peg structured to accept a generally vertical load, wherein the device is structured to retain the archery bow above the ground without the archery bow touching the ground when the device is secured to the archery bow.

15. The device of claim 14, further comprising:
a stand, the stand including a base portion and a riser, the base portion structured to rest upon the ground and the riser connected to the base portion, wherein the riser comprises an upper portion defining an upper riser aperture therethrough and a lower portion defining a lower riser aperture therethrough, the upper portion connected to the lower portion by a back portion extending therebetween, wherein the upper riser aperture and lower riser aperture are configured to receive the distal tip and at least part of the distal end of the second portion, and wherein the stand is structured to retain the archery bow above the ground within the stand without the archery bow touching the ground when the device is secured to the archery bow, and wherein the base portion includes one or more legs connecting the riser to an outer disk.

16. The device of claim 14, further comprising:

a mounting bracket including an upper portion defining an upper aperture therethrough and a lower portion defining a lower aperture therethrough, wherein the upper aperture and lower aperture are configured to receive at least a part of the distal end of the second portion therethrough, wherein the mounting bracket is configured for mounting to part of an object by fasteners that secure the mounting bracket to the object.

17. The device of claim 14, further comprising:

one or more accessories.

18. The device of claim 14, comprising part of a system, the system further comprising:

an archery bow configured to shoot arrows.

19. The device of claim 14, wherein the first portion further comprises a handle rib defining a handle aperture therethough, the handle aperture sized and shaped to receive one or more fingers of a user of the device.

20. The device of claim 14, wherein adjustment of the adjustment element permits an effective length of the device to be adjusted by way of loosening the adjustment element, moving the first portion relative to the second portion, and tightening the adjustment element.

* * * * *